UNITED STATES PATENT OFFICE

JOHN A. AESCHLIMANN, OF BASEL, SWITZERLAND, ASSIGNOR TO HOFFMANN-LA ROCHE INC., OF NUTLEY, NEW JERSEY, A CORPORATION OF NEW JERSEY

STABLE CONCENTRATED SOLUTION FOR THERAPEUTIC PURPOSES

No Drawing. Application filed January 7, 1932, Serial No. 585,399, and in Germany February 28, 1931.

It has been found that pyridones and their tetrahydro derivatives may be used with advantage as solvents or agents for increasing the solubility in water of alkaloid-salts, purine bases, hypnotics, camphor and other difficultly soluble substances. The pyridones and their tetrahydro derivatives are distinguished by their slight toxicity and their lack of irritant action. The lethal dose of 1-methyl-2-pyridone for a mouse, when injected subcutaneously, is 2.5 grams per kilogram body-weight. The 1-oxyethyl-2-pyridone (obtained by oxidation of the quarternary salt from pyridine and ethylene chlorhydrine with potassium ferricyanide as white crystals melting at 95° C.) has no lethal effect on a mouse when injected in quantities of 5 grams per kilogram body-weight. In some cases the pyridones and their tetrahydro derivatives are used alone as solvents to produce solutions miscible with water, and in others a mixture of water and pyridones or their tetrahydro derivatives is advantageously employed.

It is known that substances, such as urethanes, alkyl-ureas, pyrazolones, diketopiperazines, are suitable agents for obtaining solutions of insoluble or difficultly soluble compounds, such as quinine and quinine-salts. Thus 50% solutions of quinine hydrochloride have already been prepared with the aid of antipyrine or urethanes. These dissolving agents are however not therapeutically inactive compounds, their effect being antipyretic and soporific respectively. By using diethylacetamide, 50% solutions of quinine hydrochloride may likewise be obtained, but diethylacetamide is a great deal more toxic than the pyridones and their tetrahydro derivatives and in concentrated solution it has a strongly irritant action. Similarly the caffeine-sodium-benzoate mixture used according to Swiss patent specification No. 145,558 to produce a 10% solution of Theophylline is by no means therapeutically indifferent. The pyridones and their tetrahydro derivatives, however, are wholly indifferent compounds and have no irritant action. With Sarcosine-anhydride, likewise an indifferent compound, 40% solutions of quinine hydrochloride may be obtained, whereas with the aid of pyridones and their tetrahydro derivatives it is possible to prepare 40-70% solutions, which may be diluted with water without any precipitation of the alkaloid-salt.

The applications of the invention described in the examples given below can naturally be varied within wide limits and the pyridones and their tetrahydro derivatives can also be employed in conjunction with other known dissolving agents, without affecting the validity of the invention.

The possibility of using the pyridones and their tetrahydro derivatives as dissolving agents could not be foretold, because for instance the pyridones are described as strong bases which may attract carbonic acid from the air (Journal für praktische Chemie, Neue Folge, vol. 93, page 363). It was to be feared that, owing to this property, the solutions would exert a strongly irritant action. The aqueous solutions are almost neutral. Their pH lies between 6.0 and 6.8.

Example 1

With a mixture of 6 parts by weight of quinine hydrochloride and 4.9 parts by weight of 1-methyl-2-pyridone 10 parts by volume of a clear solution are obtained, which contain 60% of quinine hydrochloride. On being cooled to 0° C. or on being diluted with water the solution gives no precipitate.

Example 2

5 parts by weight of quinine hydrochloride and 6 parts by weight of 1-β-γ-dioxypropyl-2-pyridone are diluted with water to 25 parts by volume. A clear solution is obtained. Dioxypropylpyridone is obtained by oxidation of the pyridine-monochlorhydrine addition-product with alkaline potassium ferricyanide; it forms white crystals melting at 113° C.

Example 3

5 parts by weight of 4-pyridone, 4 parts by weight of water and 3 parts by weight of cinchonine hydrochloride (of which the solubility in water is only 5%) are mixed. The resulting solution, which contains 30% of cinchonine hydrochloride, is clear and stable.

*Example 4*

20 parts by weight of quinine hydrochloride are dissolved in 15 parts by weight of 1-ethyl-2-piperidone, whereby a 66% solution is obtained, which may be diluted with water to any desired concentration.

*Example 5*

A 60% aqueous solution of 2, 2, 5-trimethyl-4-piperidone is brought to a pH of 6.4 by addition of acid. 8 parts by volume of the solution thus obtained are stirred with 3 parts by weight of dihydro-quinine hydrochloride, whereby 10 parts by volume of a 30% neutral solution of hydroquinine hydrochloride are obtained. The solution remains clear after dilution with water.

*Example 6*

A 6% solution of Emetine hydrochloride in water gives a precipitate of the salt when cooled to 0° C. If a 2½% aqueous solution of methylpiperidone is used as solvent instead of pure water, a 7% solution of Emetine hydrochloride remains clear at 0° C., even if inoculated with a crystal of the salt.

*Example 7*

4 parts by weight of Theophylline dissolve in 100 parts by weight of a 40% aqueous solution of 1-oxyethyl-2-pyridone. The solution can be diluted.

*Example 8*

2½ parts by weight of camphor are dissolved in 100 parts by weight of 1-methyl-2-piperidone. The solution can be diluted with water and is suitable for injection.

*Example 9*

A 5% solution of Sulphonal in ethylpiperidone is stable.

*Example 10*

A 10% solution of allylisopropyl barbituric acid in 1-methyl-2-piperidone is stable. More concentrated solutions can readily be prepared in this solvent, but such solutions give a precipitate of the acid on dilution with water.

I claim:

1. A stable concentrated solution of a difficulty water-soluble compound for therapeutic purposes, which comprises a difficultly water-soluble compound selected from the group which consists of alkaloid salts, purine bases, hypnotics of the barbituric acid and sulphonal series, and camphor, and a substance to effect the solution of said compound selected from the group which consists of pyridones and their tetrahydro derivatives.

2. A stable concentrated solution of a difficulty water-soluble compound for therapeutic purposes, which comprises a difficulty water-soluble compound selected from the group which consists of alkaloid salts, purine bases, hypnotics of the barbituric acid and sulphonal series, and camphor; and a piperidone.

3. A stable concentrated solution of a difficultly water-soluble compound for therapeutic purposes, which comprises a difficultly water-soluble compound selected from the group which consists of alkaloid salts, purine bases, hypnotics of the barbituric acid and sulphonal series, and camphor; and 1-methyl-2-piperidone.

4. A stable concentrated solution of a difficultly water-soluble salt of an alkaloid of the cinchona series and a substance to effect the solution of said salt selected from the group which consists of pyridones and their tetrahydro derivatives.

5. A stable concentrated solution of a difficultly water-soluble hypnotic of the barbituric acid series and a substance to effect the solution of said hypnotic selected from the group which consists of pyridones and their tetrahydro derivatives.

6. A stable concentrated solution of camphor and a substance to effect the solution of said camphor selected from the group which consists of pyridones and their tetrahydro derivatives.

7. A stable colorless concentrated solution of quinine monohydrochloride in 1-methyl-2-piperidone, which solution can be diluted with water without precipitation of the alkaloid salt.

In witness whereof I have hereunto set my hand.

JOHN A. AESCHLIMANN.